(12) United States Patent
Kitahara et al.

(10) Patent No.: US 6,303,686 B1
(45) Date of Patent: Oct. 16, 2001

(54) RESIN COMPOSITION HAVING WATER AND OIL REPELLENCY

(75) Inventors: Takahiro Kitahara; Fumihiko Yamaguchi; Yoshitaka Honda, all of Settsu (JP)

(73) Assignee: Daikin Industries Ltd., Osaka (JP)

( * ) Notice: Subject to any disclaimer, the term of this patent is extended or adjusted under 35 U.S.C. 154(b) by 0 days.

(21) Appl. No.: 09/147,952

(22) PCT Filed: Sep. 12, 1997

(86) PCT No.: PCT/JP97/03218

§ 371 Date: May 19, 1999

§ 102(e) Date: May 19, 1999

(87) PCT Pub. No.: WO98/13421

PCT Pub. Date: Apr. 2, 1998

(30) Foreign Application Priority Data

Sep. 25, 1996 (JP) .................................................... 8-252791
Dec. 11, 1996 (JP) .................................................... 8-330891

(51) Int. Cl.[7] .................................................... C08L 27/12
(52) U.S. Cl. ......................... 524/546; 524/520; 525/199
(58) Field of Search ................... 524/520, 546; 525/199

(56) References Cited

U.S. PATENT DOCUMENTS

| | | | |
|---|---|---|---|
| 4,182,846 | | 1/1980 | Saegusa et al. ................. 528/341 |
| 4,220,583 | * | 9/1980 | Mark ............................... 524/161 |
| 4,250,300 | | 2/1981 | Saegusa et al. ................. 528/401 |
| 4,703,076 | * | 10/1987 | Mori ............................... 524/420 |
| 4,787,991 | * | 11/1988 | Morozumi et al. ............... 252/12.4 |
| 4,963,609 | * | 10/1990 | Anderson et al. ................ 524/413 |
| 5,010,130 | * | 4/1991 | Chapman, Jr. et al. .......... 524/520 |
| 5,106,911 | * | 4/1992 | Chapman, Jr. et al. .......... 525/199 |
| 5,159,019 | * | 10/1992 | Yamamoto et al. .............. 525/187 |
| 5,821,319 | * | 10/1998 | Shibuga et al. .................. 524/425 |

FOREIGN PATENT DOCUMENTS

| | | |
|---|---|---|
| 0322877A2 | 5/1989 | (EP) . |
| 0373588A2 | 6/1990 | (EP) . |
| 0393480A1 | 10/1990 | (EP) . |
| 0460689A1 | 12/1991 | (EP) . |
| 0481509A2 | 4/1992 | (EP) . |
| 53139696 | 12/1978 | (JP) . |
| 53139697 | 12/1978 | (JP) . |
| 63066256 | 3/1988 | (JP) . |
| 63120789 | 5/1988 | (JP) . |
| 63312836 | 12/1988 | (JP) . |
| 01123849 | 5/1989 | (JP) . |
| 01247408 | 10/1989 | (JP) . |
| 02158651 | 6/1990 | (JP) . |
| 02274711 | 11/1990 | (JP) . |
| 0300745 | 1/1991 | (JP) . |
| 03041162 | 2/1991 | (JP) . |
| 04020217 | 1/1992 | (JP) . |
| 04076030 | 3/1992 | (JP) . |
| 04076057 | 3/1992 | (JP) . |
| 04085349 | 3/1992 | (JP) . |
| 04154842 | 5/1992 | (JP) . |

* cited by examiner

Primary Examiner—Peter Szekely
(74) Attorney, Agent, or Firm—Birch, Stewart, Kolasch & Birch, LLP

(57) ABSTRACT

The resin composition of the present invention comprises (a) a fluorine-free resin, (b) a fluorine-containing resin, and (c) a polyfluoroalkyl group-containing polymer, has excellent impact strength, and repels a flux.

15 Claims, No Drawings

RESIN COMPOSITION HAVING WATER AND OIL REPELLENCY

This application is the national phase under 35 U.S.C. §371 of prior PCT International Application No. PCT/JP97/03218 which has an International filing date of Sep. 12, 1997 which designated the United States of America.

1. Field of the Invention

The present invention relates to a resin composition and a resin molded article produced from said resin composition.

2. Related Arts

Hitherto, in making a thermoplastic resin flame resistant, it is known that for the purpose of preventing to dripping at the time of combustion and of increasing flame retardancy, fibrillated polytetrafluoroethylene (PTFE) together with a flame-retardant is added to the thermoplastic resin to compound a flame-retardant resin.

The amount of PTFE added to such flame-retardant thermoplastic resin is an amount which is as low as about 0.1 to 1.0% by weight, but is sufficient to exhibit the prevention of dripping at the time of combustion.

However, because PTFE does not have affinity for other materials, there is the disadvantage that its addition even in such a small amount significantly lowers the impact strength of thermoplastic resin.

Further, PTFE is added for the purpose of conferring sliding properties on the thermoplastic resin. The addition amount in this case is varied depending on sliding use and the type of thermoplastic resin. As to low-sliding use, for e.g. CD-ROM tray materials such as in personal computers, PTFE is added in an amount of 2 to 5% by weight to an acrylonitrile/butadiene/styrene (ABS) resin, and even for gears used in OA (office automation) instruments, PTFE is added in an amount of about 5% by weight to a polycarbonate resin.

As to high-sliding use, e.g. in bearing materials, there are also cases where PTFE is added in an amount of 20 to 50% by weight to polyphenylene sulfide.

Even in cases where PTFE is added in a relatively large amount, there is the disadvantage of reduction in impact strength.

Further, hitherto, when connectors and sockets used in electrical and electronic parts are produced, terminals are attached by soldering to a connector resin and by passing the terminal through a through-hole. Due to capillarity, the flux used is passed through the through-hole and raised to the terminal. Because acidic components are contained in the flux, they can be the cause of terminal corrosion to cause a contact failure and the like.

SUMMARY OF THE INVENTION

An object of the present invention is to provide a resin composition which has excellent impact strength and repels a flux well.

The present invention provides a resin composition comprising:

(a) a fluorine-free thermoplastic resin, (b) a fluorine-containing resin which is a homopolymer, modified polymer or core/shell polymer of tetrafluoroethylene, and (c) a polyfluoroalkyl group-containing polymer.

The resin composition of the present invention may further comprise (d) a flame-retardant.

The present invention further provides a resin molded article produced from said resin composition.

DETAILED DESCRIPTION OF THE INVENTION

The fluorine-free resin (a) is a thermoplastic resin or thermosetting resin having no fluorine atom.

The thermoplastic resin includes a styrene-type resin (e.g. polystyrene, acrylonitrile/styrene resin (AS), acrylonitrile/butadiene/styrene resin (ABS)); an olefin-type resin (e.g. polyethylene, polypropylene, polymethylpentene); polyvinyl chloride; a carbonate-type resin (e.g. polycarbonate (PC), a PC-type alloy resin such as a polycarbonate-acrylonitrile/butadiene/styrene alloy resin (PC/ABS)); a polyamide-type resin (e.g. nylon, wholly aromatic polyamide); a polyester-type resin (e.g. polybutylene terephthalate, polyethylene terephthalate, wholly aromatic polyester); a polyamide-type alloy resin; a polyester-type alloy resin; an acrylic resin (e.g. polymethyl methacrylate, polyacrylonitrile); polyacetal; polyether ether ketone; and polyphenylene sulfide; modified polyphenylene ether.

The thermosetting resin includes an epoxy resin; a phenol resin; a urea resin; a melamine resin; an alkyd resin; an unsaturated polyester resin; diallyl phthalate (DAP) resin; polyurethane; and a silicone resin.

The weight average molecular weight of the fluorine-free resin (a) may be from 1000 to 1,000,000.

The fluorine-containing resin (b) may be a homopolymer, modified polymer or core/shell polymer of tetrafluoroethylene (TFE). The fluorine-containing resin (b) may be fine powder obtained by emulsion polymerization or molding powder obtained by suspension polymerization.

The modified polymer of tetrafluoroethylene is a copolymer prepared by copolymerizing the following modifying monomers in an amount of 0.001 to 1.0% by weight (based on the copolymer). The modifying monomers used in the modified polymer include e.g. hexafluoropropylene, trifluoromonochloroethylene, perfluorovinyl ether, and fluoroalkyl ethylene. The core/shell polymer is described in e.g. Japanese Patent Kokai Publication Nos. 154,842/1992, 158,651/1990, 274,711/1990, 247,408/1989, and 312,836/1988.

The core/shell polymer includes e.g. (i) polytetrafluoroethylene fine particles having an average particle size of 0.05 to 1.0 $\mu$m comprising a core made of high-molecular-weight polytetrafluoroethylene that can be fibrillated and a shell made of low-molecular-weight polytetrafluoroethylene that can not be fibrillated and (ii) fine particles having an average particle size of 0.05 to 1.0 $\mu$m comprising a core, that is, a polymer made of 99 to 100% by weight of tetrafluoroethylene and 0 to 1% by weight of a fluorine-containing olefin copolymerizable with tetrafluoroethylene, and a shell, that is, at least one copolymer selected from the group consisting of ethylene/tetrafluoroethylene copolymers, ethylene/chlorotrifluoroethylene copolymers, tetrafluoroethylene/ethylene/hexafluoropropylene copolymers, tetrafluoroethylene/hexafluoropropylene copolymers, tetrafluoroethylene/perfluorovinyl ether copolymers, tetrafluoroethylene/hexafluoropropylene/perfluorovinyl ether copolymers and vinylidene fluoride/tetrafluoroethylene copolymers.

The fluorine-containing resin (b) may be low-molecular-weight (e.g. a weight average molecular weight of $1 \times 10^4$ to $8 \times 10^5$) tetrafluoroethylene homopolymers and modified polymers.

The fluorine-containing resin (b) may be tetrafluoroethylene/hexafluoropropylene copolymers (FEP), tetrafluoroethylene/perfluorovinyl ether copolymers (PFA), ethylene/tetrafluoroethylene copolymers (ETFE), polyvinylidene fluoride (PVdF), tetrafluoroethylene/ethylene/hexafluoropropylene copolymers, tetrafluoroethylene/hexafluoropropylene/perfluorovinyl ether copolymers, and vinylidene fluoride copolymers. A comonomer copolymerized with vinylidene fluoride in vinylidene fluoride copolymers includes tetrafluoroethylene (TFE), hexafluoropropylene (HFP), chlorotrifluoroethylene (CTFE), trifluoromonochloroethylene (TrFE), and a combination thereof The weight average molecular weight of the fluorine-containing resin (b) may be from $1 \times 10^3$ to $1 \times 10^7$.

The amount of the fluorine-containing resin (b) may be from 0.01 to 100 parts by weight, based on 100 parts by weight of the fluorine-free resin (a). The amount is preferably varied depending on the desired use. For example, in order to confer the dripping prevention properties on the thermoplastic resin, the amount is preferably from 0.1 to 5.0 parts by weight. To confer the sliding properties, the amount is preferably from 2 to 60 parts by weight.

The polyfluoroalkyl group-containing polymer (c) may be a homopolymer of a polyfluoroalkyl group-containing monomer or a copolymer of said monomer and a comonomer copolymerizable therewith.

The polyfluoroalkyl group-containing monomer may be compounds described in Japanese Patent Kokai Publication Nos. 41162/1991 and 7745/1991. The polyfluoroalkyl group-containing monomer may be polyfluoroalkyl group-containing (meth)acrylate. Examples of polyfluoroalkyl group-containing (meth)acrylate are as follows:

$CH_2=CHCOOC_2H_4(CF_2CF_2)_nCF_2CF_3$
$CH_2=C(CH_3)COOC_2H_4(CF_2CF_2)_nCF_2CF_3$
$CH_2=C(CH_3)COOC_2H_4(CF_2CF_2)_nCF(CF_3)_2$
$CH_2=C(CH_3)COOCH_2C_nF_{2n+1}$
$CH_2=C(CH_3)COOCH_2(CF_2CF_2)_nH$
$CH_2=CHCOOCH_2C_nF_{2n+1}$
$CH_2=CHCOOCH_2(CF_2CF_2)_nH$
$CH_2=CHCOOC_2H_4N(C_2H_5)SO_2(CF_2CF_2)_3CF_3$
$CH_2=C(CH_3)COOC_2H_4N(C_2H_5)SO_2(CF_2CF_2)_3CF_3$ (n=an integer of 1 to 10)

The number of carbon atoms in the polyfluoroalkyl group may be from 5 to 18. The polyfluoroalkyl group may be a perfluoroalkyl group. In particular, (meth)acrylic ester where the number of carbon atoms in the polyfluoroalkyl group ranges from 8 to 12 is preferable. These are used alone or in combination thereof.

The comonomer copolymerizable with a polyfluoroalkyl group-containing monomer includes (meth)acrylate alkyl ester, (meth)acrylic acid amide, vinyl acetate, vinyl chloride, styrene, α-methylstyrene, polyoxyethylene (meth)acrylate, and polyoxypropylene (meth)acrylate.

The polyfluoroalkyl group-containing polymer (c) may be polyfluoroesters. The polyfluoroesters are polyfluoroalkyl group- and ester group-containing compounds and may be compounds described in Japanese Patent Kokai Publication Nos. 139,696/1978 and 139,697/1978.

The polyfluoroesters possess the repeating units represented by formula (1) or (2):

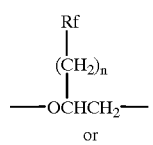

(1)

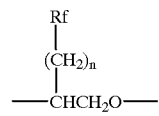

(2)

wherein Rf is a polyfluoroalkyl group containing 3 to 21 carbon atoms, and n is an integer of 0 or 1, and repeating units represented by formula (3):

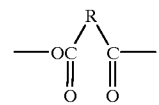

(3)

wherein R is a residue remaining after removing the group:

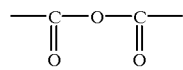

from cyclic anhydride.

In addition to the repeating units represented by formula (1) or (2) and (3), the polyfluoroesters may, if necessary, have repeating units represented by the formula: —$(OCR^1R^2CR^3R^4)$— and/or the formula:

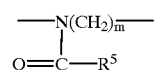

wherein $R^1$, $R^2$, $R^3$ and $R^4$ each represents a hydrogen atom, an alkyl or aryl group optionally having a substituent group, $R^5$ represents a hydrogen atom, an alkyl or aryl group optionally having a substituent group, and m is an integer of 2 or 3.

The weight average molecular weight of the polyfluoroalkyl group-containing polymer (c) may be from 1,000 to 1,000,000.

The amount of the polyfluoroalkyl group-containing polymer (c) may be from 0.001 to 50 parts by weight, preferably 0.01 to 10 parts by weight, e.g. 0.1 to 5 parts by weight, based on 100 parts by weight of the fluorine-free resin.

Typical examples of the flame-retardant (d) are compounds containing Group 5B elements in the periodic table, such as nitrogen, phosphorus, antimony and bismuth, and compounds containing Group 7B halogen elements. The halogen-containing compounds include aliphatic halogen-containing compounds, alicyclic halogen-containing compounds, aromatic organic halogen-containing compounds such as bromine-type compounds, for example, tetrabromobisphenol A (TBA), decabromodiphenyl ether (DBDPE), octabromodiphenyl ether (OBDPE), TBA epoxy/phenoxy oligomers and brominated crosslinked polystyrene, and chlorine-type compounds, for example, chlorinated paraffin and perchlorocyclopentadecane. The phosphorus-containing compounds include e.g. phosphorate esters and polyphosphate salts. The antimony-containing compounds are used preferably in combination with halogen compounds and include e.g. antimony trioxide and antimony pentaoxide. Besides, aluminum hydroxide, magnesium hydroxide, and molybdenum trioxide can also be used. The type and the addition amount of the flame-retardant (d) can be arbitrarily selected and are not limited to those exemplified.

The amount of the flame-retardant (d) may be from 0 to 40 parts by weight, e.g. 0.01 to 30 parts by weight, based on 100 parts by weight of the fluorine-free resin (a).

Further, additives known in the art, such as UV absorbers, antioxidants, pigments, molding auxiliary agents, calcium carbonate and glass fibers, may be added, if necessary, to the resin composition of the present invention.

The means of blending the resin composition of the present invention includes, but is not limited to, single-screw extruders, twin-screw extruders, open rolls, kneaders and mixers.

The resin composition of the present invention can be used as flame-retardant resin and sliding members used in OA (office automation) instruments (e.g. housing materials for personal computers, facsimile machines, copying machines and printers, chassis materials, CD-ROM tray materials, bearing sliding members, paper-sending materials and key board materials).

The resin composition of the present invention can also be used as a resin which has sliding properties, is resistant to abrasion resistance, and dissolves creak sounds in e.g. electric appliances (e.g. air conditioners and videotape recorders), cameras and automobile parts.

It was further found that a resin molded article excellent in water- and oil-repellency can be obtained by adding the polyfluoroalkyl group-containing polymer having low surface tension to the resin composition of the present invention. It was found that the water- and oil-repellency can be further improved by thermally treating the resin molded article at 70 to 130° C. and that the resulting article can also be used in kitchen utensils, bathroom articles, toilet equipments (e.g. washbasin, bathtub and sanitary container).

Specific examples of the molded articles include:

bathroom articles (a bathtub, an interior portion of an unit bath, a washbasin, a bucket, a soap stand, a soap dish, a shampoo rack, and a chair);

kitchen utensils (a ceiling door in a system kitchen, a sink, a washbasin, a triangular corner, a draining bucket, and a detergent rack);

toilet equipment (a toilet seat, a paper holder, a toilet corner, a water tank, a towel rack, a toilet brush and its casing);

hygienic nursing articles (a portable toilet, a handy toilet seat and a handrail);

washroom equipment (a washstand, a tube stand, a toothbrushing cup, a tray, a towel rack, and a miller stand);

cleaning equipment (a bucket, compost, a tub, and a garbage can);

closet equipment (a cloth case, a caster rack, and a hook); and articles for babies (a bedpan, a toilet seat for children, a baby sink, a stool, and a baby bottle).

The resin composition of the present invention can be used in portions liable to dirt in home (e.g. a sash, a floor material sheet, a wall paper, a chemical tatami mat, a cabinet for TV and radio, an audio rack, and an inner cover in a refrigerator).

The time for thermal treatment may be 30 minutes to 20 hours, e.g. 1 to 3 hours.

Further, the resin composition of the present invention can be used as a resin for preventing flux from raising in materials (particularly polybutylene terephthalate resin) of electrical or electronic connectors. If the resin composition of the present invention is used as a connector member, it is possible to prevent flux from raising to a terminal when the terminal is passed through a through-hole in order to solder the terminal.

The resin composition of the present invention can be molded to give a molded article. Molding can be conducted by injection molding, compression molding, transfer molding, extrusion molding, blow molding and calendar molding.

EXAMPLES

Hereinafter, the term "part" refers to part by weight unless otherwise specified.

The tests in the present invention were conducted in the following manner.

Impact Energy

As an impact energy value, the average of 10 measurements of an unnotched specimen was determined at a hammer capacity of 60 kgf.cm at an impact rate of 3.45 m/sec. in a Charpy impact testing machine (manufactured by Toyo Seiki Co., Ltd.).

Flame Retardance

Flame retardance was measured in accordance with United States UL (underwriters' laboratories) 94 combustion test, V class.

Contact Angle

A contact angle of water and n-hexadecane on the surface of a molded article was determined using a contact angle measuring instrument (manufactured by Kyowa Kaimen Kagaku K. K.).

Friction Coefficient

An abrasion wear volume of a sample against an ABS resin (Diapet ABS1002, manufactured by Mitsubishi Rayon Co., Ltd.) was determined at a loading of 1000 g/cm$^2$, at a rotation rate of 0.3 m/sec. for a measurement time of 24 hours in a thrust abrasion testing machine (manufactured by Orientec K.K.). A specific abrasion wear was calculated from the abrasion wear volume according to the following equation:

$$\text{Specific abrasion wear} = W/P \cdot V \cdot T$$

wherein

W is an abrasion wear volume (cm$^3$),

P is a loading (kg),

V is a rotation rate (m/sec) and

T is a measurement time (hr).

Flux Barrier Properties

A molded article was provided with a small through-hole for insertion of a lead terminal, and this molded article was immersed in 80 weight-% solution of commercial flux (Solderite CF-220VH) in isopropyl alcohol and then the lead terminal was inserted into the through-hole, and whether the flux was raised to the lead terminal or not was evaluated with eyes.

○: The flux did not raise to the lead terminal.

X: The flux raised to the lead terminal.

Synthesis Example 1

A 2 L four-necked flask was charged with 300 g of polyfluoroalkyl acrylate [CH$_2$=CHCOOC$_2$H$_4$(CF$_2$CF$_2$)$_n$CF$_2$CF$_3$ (average of n: 3.65)], 300 g of stearyl methacrylate [CH$_2$=C(CH$_3$)COOC$_{17}$H$_{35}$], 600 g of isopropyl alcohol (solvent), and 30 g of laurylmercaptan (solvent), and the atmosphere in the flask was replaced by nitrogen. After the temperature was raised to 70° C., 4 g of azobisisobutyronitrile was added to it, and the mixture was polymerized for 15 hours with stirring. Thereafter, the reaction mixture was introduced into a large amount of methanol to form precipitates, and the precipitates were separated by filtration and dried at 40° C. under reduced pressure whereby 538 g of a polyfluoroalkyl group-containing polymer was obtained. This polymer was comminuted in a mortar to give powder.

Synthesis Example 2

The same procedure as in Synthesis Example 1 was repeated except that the amount of polyfluoroalkyl acrylate was 210 g, the amount of stearyl methacrylate was 90 g and 600 g of n-perfluorohexane was used in place of 600 g isopropyl alcohol, whereby 261 g of polyfluoroalkyl group-containing polymer powder was obtained.

Example 1

100 parts of an ABS resin (thermoplastic resin) [ABS15, manufactured by Japan Synthetic Rubber Co., Ltd.], 22.5 parts of brominated epoxy resin (flame-retardant) [YDB-408, manufactured by Tohto Kasei K. K.], 7.0 parts by weight of antimony trioxide (flame-retardant) [ATOX-S, manufactured by Nihon Seiko Co., Ltd.], and 0.39 part of powder in which polytetrafluoroethylene fine powder [Polyflon F-201, manufactured by Daikin Industries Ltd.] and the polyfluoroalkyl group-containing polymer prepared in Synthesis Example 1 had been preliminarily blended at the weight ratio of 2: 1, were mixed at room temperature for 10 minutes in a tumbler, and compounded and pelletized in a twin-screw kneading extruder to give a flame-retardant ABS resin composition.

The conditions for the kneading extrusion were an extrusion temperature of 210° C., a screw revolution of 130 rpm and a feeding of 8 kg/hr.

Then, an UL94 combustion specimen (5 inches in length, ½ inch in width and 1/16 inch in thickness) and a Charpy impact specimen (5 inches in length, ½ inch in width and ⅛ inch in thickness) were prepared in an injection molding machine [SG50, manufactured by Sumitomo Heavy Industries, Ltd.]. Then, the UL94 combustion test and the Charpy impact test were conducted. The results are shown in Table 1.

Comparative Example 1

The same procedure as in Example 1 was repeated except that the polyfluoroalkyl group-containing polymer prepared in Synthesis Example 1 was not used. The results are shown in Table 1.

Example 2

100 parts of ABS resin (thermoplastic resin) [ABS15, manufactured by Japan Synthetic Rubber Co., Ltd.], 4.0 parts of a polytetrafluoroethylene low-molecular weight polymer [Lubron L-5, manufactured by Daikin Industries Ltd.] (weight average molecular weight of about 300,000), and 2.0 parts of the polyfluoroalkyl group-containing polymer prepared in Synthesis Example 1 were mixed in the same manner as in Example 1 to give an ABS resin composition.

A Charpy impact test specimen (5 inches in length, ½ inch in width, and ⅛ inch in thickness) and an abrasion test specimen (a molded disk having an outer diameter of 4.6 cm, an inner diameter of 1.2 cm, and a thickness of 0.3 cm) were prepared in the injection molding machine in the same manner as in Example 1, and the Charpy impact test and the abrasion test were conducted. The results are shown in Table 1.

Further, the Charpy impact test specimen was thermally treated at 90° C. for 1 hour and then examined for contact angle with water and n-hexane. The results are shown in Table 1.

Comparative Example 2

The same procedure as in Example 2 was repeated except that the polyfluoroalkyl group-containing polymer prepared in Synthesis Example 1 was not used. The results are shown in Table 1.

Example 3

The same procedure as in Example 2 was repeated except that a core/shell polymer of polytetrafluoroethylene described in Example 2 in Japanese Patent Kokai Publication No. 154,842/1992 was used in place of the polytetrafluoroethylene low-molecular weight polymer. The results are shown in Table 1.

The core/shell polymer of polytetrafluoroethylene was produced in the following manner. A 6 L stainless steel autoclave was charged with 2960 mL of de-ionized water and 1.0 g of ammonium perfluorooctanoate, and while the mixture was heated at 55° C., the atmosphere in the system was replaced 3 times by a nitrogen gas and 2 times by a tetrafluoroethylene (TFE) gas to remove oxygen, and the system was kept at an internal pressure of 8 kgf/cm$^2$ with TFE with stirring at 250 rpm and at an internal temperature of 55° C. An aqueous solution of 30 mg (10 ppm based on total amount of water) of ammonium persulfate (APS) in 20 mL of water was introduced by compressing it with TFE, and the internal pressure of the autoclave was made 9 kgf/cm$^2$. The reaction proceeded acceleratively, during which the system was kept at a reaction temperature of 55° C. with stirring at 250 rpm. TFE was continuously fed so that the internal pressure of the autoclave was kept at 9±0.5 kgf/cm$^2$. Once TFE consumed during the reaction reached 390 g after addition of the initiator, the feeding of TFE and stirring were terminated, and the TFE in the autoclave was released.

Then, while the internal pressure was raised to 9 kgf/cm$^2$ by TFE, an aqueous solution of 1800 mg (600 ppm based on total amount of water) of APS in 20 mL of water, and 36 g of 1,2-dichloroethane were compression-introduced. Thereafter, the reaction was initiated again by stirring, and TFE was continuously fed so that the internal pressure of the autoclave was kept at 9±0.5 kgf/cm$^2$. Once 780 g of TFE monomer was consumed in the reaction, the stirring and feeding of the monomer were terminated, and immediately the gas in the autoclave was released to give a normal pressure to terminate the reaction. The weight ratio of the core to the shell in the resulting polymer was 50: 50. The total reaction time was 20 hours. Ammonium carbonate was added to the resulting latex, and the mixture was stirred, coagulated, washed, and dried at 140° C. for 15 hours to give tetrafluoroethylene core/shell polymer powder.

Example 4

100 parts by weight of a polybutylene terephthalate resin (thermoplastic resin) [1401X06, manufactured by Toray], 20 parts by weight of a brominated epoxy resin (flame-retardant) [YDB-408, manufactured by Toto Kasei K. K.], 7 parts by weight of antimony trioxide (flame-retardant) [ATOX-S, manufactured by Nihon Seiko Co., Ltd.], 1.3 parts by weight of polytetrafluoroethylene fine powder [Polyflon MPA FA-500, manufactured by Daikin Industries Ltd.], and 2.0 parts by weight of the polyfluoroalkyl group-containing copolymer prepared in Synthesis Example 2 were preliminarily mixed at room temperature for 10 minutes in a tumbler, and compounded and pelletized in a twin-screw extruder to give a PBT resin composition.

The conditions for kneading extrusion were an extrusion temperature of 240° C., a screw revolution of 130 rpm and a feeding of 8 kg/hr.

Then, an UL94 combustion specimen and a Charpy impact specimen were prepared and the tests were performed. Further, a flux barrier test was conducted using the UL94 combustion specimen. The results are shown in Table 1.

Comparative Example 3

The same procedure as in Example 4 was repeated except that the polyfluoroalkyl group-containing polymer prepared in Synthesis Example 2 was not used. The results are shown in Table 1.

Synthesis Example 3

526 g of Rf epoxy shown in the formula:

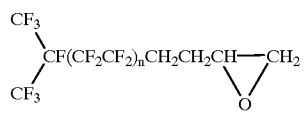

(n=3.5), 120 g of phenyl glycidyl ether, 238 g of phthalic anhydride and 41 g of acetic anhydride were introduced into a 1.5 L glass reaction vessel and heated to 130° C. in an oil bath. After the whole of the mixture was dissolved, 0.72 g of N,N-dimethylbenzylamine was added and reacted for 10 hours with stirring, and the reaction was terminated when a peak of the Rf epoxy in gas chromatography disappeared. After the reaction was finished, the polymer was poured onto a vat, cooled to be solidified, and ground to give powder.

Synthesis Example 4

876 g of the Rf epoxy (the same as in Synthesis Example 3), 31 g of succinic anhydride and 104 g of phthalic anhydride were introduced into a 1.5 L glass reaction vessel and heated to 140° C. in an oil bath. 1.00 g of N,N-dimethylbenzylamine was added and the mixture was reacted for 15 hours with stirring. The reaction was terminated when a peak of the Rf epoxy in gas chromatography disappeared. After the reaction was finished, the polymer was poured onto a vat, cooled to be solidified, and ground to give powder.

Example 5

4.0 parts of a polytetrafluoroethylene low-molecular weight polymer [Lubron L-5, manufactured by Daikin Industries Ltd.] (weight average molecular weight of about 300,000) and 2.0 parts of the polyfluoroalkyl group-containing polymer prepared in Synthesis Example 3 were added to 100 parts of a phenol resin (PM840J, manufactured by Sumitomo Bakelite Co., Ltd.) as thermosetting resin and sufficiently kneaded in a kneader and uniformly dispersed in the resin. Then, this resin was molded under the conditions of a die temperature of 165° C. and a curing rate of 3 minutes whereby a molded article of 5 cm square and 0.3 cm in thickness was obtained. This molded article was thermally treated at 100° C. for 1 hour and measured for contact angle toward water and n-hexadecane. The results are shown in Table 1.

Example 6

4.0 parts of polytetrafluoroethylene low-molecular weight polymer [Lubron L-5, manufactured by Daikin Industries Ltd.] (weight average molecular weight of about 300,000) and 2.0 parts of the polyfluoroalkyl group-containing polymer in Synthesis Example 4 were added to 100 parts of an unsaturated polyester resin (AP301B, manufactured by Toshiba Chemical) and sufficiently kneaded in a kneader and uniformly dispersed in the resin. Then, this resin was molded under the conditions of a die temperature of 145° C. and a curing rate of 3 minutes whereby a molded article of 5 cm square and 0.3 cm in thickness was obtained. This molded article was thermally treated and then measured for contact angle in the same manner as in Example 5. The results are shown in Table 1.

Comparative Example 4

The phenol resin was cured and measured for contact angle in the same manner as in Example 5 except that both of polytetrafluoroethylene and the compound prepared in Synthesis Example 3 were not added. The results are shown in Table 1.

Comparative Example 5

The unsaturated polyester resin was cured and measured for contact angle in the same manner as in Example 6 except that the polytetrafluoroethylene and the compound prepared in Synthesis Example 4 were not added. The results are shown in Table 1.

TABLE 1

|  | Impact Energy (kgf · cm) | Flame Retardance | | Contact Angle (°) | | Specific Abrasion | Flux Barrier Properties |
|---|---|---|---|---|---|---|---|
|  |  | V Class | Number of Droplets | Water | n-Hexadecane | Wear ($\times 10^{-5}$ cm$^3$ · sec/ kg · m · hr) |  |
| Example 1 | 32 | V-0 | 0/10 | — | — | — | — |
| Comparative Example 1 | 13 | V-0 | 0/10 | — | — | — | — |
| Example 2 | 52 | — | — | 90° | 44° | 263 | — |
| Example 3 | 54 | — | — | 89° | 44° | 223 | — |
| Comparative Example 2 | 12 | — | — | 74° | 22° | 320 | — |
| Example 4 | 22 | V-0 | 0/10 | 105° | 48° | — | ○ |
| Comparative Example 3 | 8 | V-0 | 0/10 | 76° | 24° | — | X |
| Example 5 | — | — | — | 88° | 53° | — | — |
| Example 6 | — | — | — | 86° | 56° | — | — |
| Comparative Example 4 | — | — | — | 76° | 14° | — | — |
| Comparative Example 5 | — | — | — | 74° | 16° | — | — |

EFFECTS OF THE INVENTION

The resin composition of the present invention contains the polyfluoroalkyl group-containing polymer which is compatible with both the fluorine-free resin and the fluorine-containing resin added for conferring the flame retardance, dripping-preventing properties and sliding properties on said fluorine-free resin, thus giving a molded article excellent in impact resistance. Further, the resin composition of the present invention is excellent in water- and oil-repellency, thus attaining the effect of repelling flux. This repellency is considered attributable to transfer of the polyfluoroalkyl group-containing polymer to the surface of a molded article after molding the resin composition.

What is claimed is:

1. A resin composition comprising:
   (a) a fluorine-free thermoplastic resin,
   (b) a fluorine-containing resin which is a homopolymer, modified polymer or core/shell polymer of tetrafluoroethylene, and
   (c) a polyfluoroalkyl group-containing polymer, comprising:
       a polyfluoroalkyl group-containing (meth)acrylate containing a polyfluoroalkyl group having 5 to 18 carbon atoms or polyfluoroalkyl group-containing polymer comprising a polyfluoroester containing a polyfluoroalkyl group having 3 to 21 carbon atoms.

2. The resin composition according to claim 1, which further comprises (d) a flame-retardant.

3. A resin molded article comprising the resin composition of claim 1.

4. The resin molded article according to claim 3, wherein the resin composition further comprises (d) a flame retardant.

5. The resin molded article according to claim 3, wherein the resin composition is molded and then thermally treated at 70 to 130° C.

6. The resin composition according to claim 1, wherein the polyfluoroalkyl group-containing polymer (c) is present in an amount of 0.01 to 10 parts by weight based on 100 parts by weight of the fluorine-free thermoplastic resin (a).

7. The resin composition according to claim 1, wherein the polyfluoroalkyl group-containing polymer (c) is present in an amount of 0.01 to 5 parts by weight based on 100 parts by weight of the fluorine-free thermoplastic resin (a).

8. The resin composition according to claim 1, wherein the polyfluoroalkyl group-containing polymer is a polyfluoroalkyl group-containing (meth)acrylate containing a polyfluoroalkyl group having 5 to 18 carbon atoms.

9. The resin composition according to claim 1, wherein the polyfluoroalkyl group-containing polymer is a polyfluoroester containing a polyfluoroalkyl group having 3 to 21 carbon atoms.

10. The resin composition according to claim 8, wherein the polyfluoroalkyl group-containing (meth)acrylate is selected from the group consisting of
$CH_2=CHCOOC_2H_4(CF_2CF_2)_nCF_2CF_3$,
$CH_2=C(CH_3)COOC_2H_4(CF_2CF_2)_nCF_2CF_3$,
$CH_2=C(CH_3)COOC_2H_4(CF_2CF_2)_nCF(CF_3)_2$,
$CH_2=C(CH_3)COOCH_2C_nF_{2n+1}$,
$CH_2=C(CH_3)COOCH_2(CF_2CF_2)_nH$,
$CH_2=CHCOOCH_2C_nF_{2n+1}$,
$CH_2=CHCOOCH_2(CF_2CF_2)_nH$,
$CH_2=CHCOOC_2H_4N(C_2H_5)SO_2(CF_2CF_2)_3CF_3$, and
$CH_2=C(CH_3)COOC_2H_4N(C_2H_5)SO_2(CF_2CF_2)_3CF_3$,
wherein n is an integer of 1 to 10.

11. The resin composition according to claim 10, wherein the polyfluoroalkyl group-containing (meth)acrylate is copolymerized with a polyfluoroalkyl group-containing monomer selected from the group consisting of (meth)acrylate alkyl ester, (meth)acrylic acid amide, vinyl acetate, vinyl chloride, styrene, α-methylstyrene, polyoxyethylene (meth)acrylate, and polyoxypropylene (meth)acrylate.

12. The resin composition according to claim 9, wherein the polyfluoroester possesses repeating units represented by formula (1) or (2):

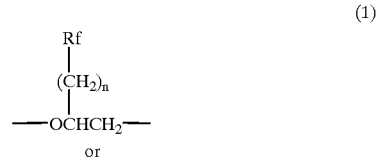

or

wherein Rf is a polyfluoroalkyl group-containing 3 to 21 carbon atoms, and n is an integer of 0 to 1, and repeating units represented by formula (3):

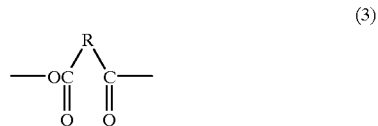

wherein R is a residue remaining after removing the group:

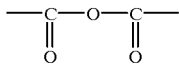

from cyclic anhydride.

13. The resin composition according to claim 12, wherein the polyfluoroester additionally possesses repeating units represented by the formula:

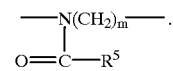

14. The resin composition according to claim 1, wherein the weight average molecular weight of the polyfluoroalkyl group-containing polymer (c) is from 1,000 to 1,000,000.

15. The resin composition according to claim 4, wherein the flame-retardant (d) is present in the amount of 0.01 to 30 parts by weight based on 100 parts by weight of the fluorine-free thermoplastic resin.

* * * * *